Patented June 1, 1948

2,442,681

UNITED STATES PATENT OFFICE 2,442,681

RESOLUTION OF A MIXTURE OF THE STEREOISOMERS OF CIS - 2 - (4'-CARBOXY - BUTYL)-3:4-UREIDO - TETRAHYDROTHIOPHENE

Karl Folkers, Plainfield, Ralph Mozingo, Elizabeth, and Donald E. Wolf, Rahway, N. J., assignors to Merck & Co., Inc., Rahway, N. J., a corporation of New Jersey No Drawing. Application September 16, 1944, Serial No. 554,460

11 Claims. (Cl. 260—309)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

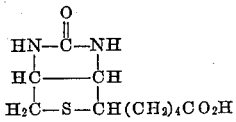

This compound can be synthesized as described in concurrently filed applications, Serial Nos. 554,458, 554,459, now U. S. Patent No. 2,437,719, 554,450, 554,451, 554,452, 554,453, 554,454, 554,455, 554,456 and 554,457. When thus synthesized, racemates of stereoisomers of 2-(4'-carboxy-butyl)-3:4-ureido - tetrahydrothiophene, identified by the configuration of the precursor 3:4-diamino-intermediate, are obtained as follows:

1. A racemate of trans-allo-stereoisomers, melting point about 194–196° C.;
2. A racemate of cis-stereoisomers, melting point about 232° C.; and
3. A racemate of trans-epiallo-stereoisomers, melting point above 195° C. (with decomposition).

The present invention is concerned with resolution of the stereoisomers of the second racemate (M. P. about 232° C.) above mentioned.

In accordance with the present invention, the stereoisomers of the above racemate of cis-2-(4'-carboxy - butyl)-3:4-ureido-tetrahydrothiophene (M. P. about 232° C.) are separated by forming an ester of at least one of the component stereoisomers with an optically active alcohol, and separating said ester from the mixture. Among optically active alcohols especially suitable for utilization in the process according to this invention are pure stereoisomers of mandelic acid or a similar optically active hydroxy-carboxylic acid. It is preferred to prepare the esters by converting the racemate of stereoisomers to a racemate of the corresponding stereoisomeric acid halides, followed by treatment with the selected optically active alcohol to yield the desired ester.

The following example illustrates a method of carrying out the present invention, but it is to be understood that this example is given by way of illustration and not of limitation.

Example

About .554 g. of dl-cis-2-(4'-carboxy-butyl)-3:4-ureido-tetrahydrothiophene (M. P. about 232° C.) is dissolved in excess thionyl chloride at room temperature, the excess thionyl chloride is removed in vacuo and to the residue is added a solution prepared by dissolving approximately .4 g. of l-mandelic acid in 30 cc. of hot chloroform. The mixture thus obtained is agitated until complete solution is effected. The chloroform is removed in vacuo and the oily residue is extracted with ethyl acetate, yielding from the extract a tan oil which when extracted with hot water left a brown amorphous residue. Upon recrystallization of this residue from methanol, the pure l-mandelic acid ester of d-cis-2-(4'-carboxybutyl) - 3:4 - ureido-tetrahydrothiophene (M. P. 188–189° C.) is obtained, which when saponified with aqueous alkali followed by acidification, yields biotin. The acid ester of the l-stereoisomer can be recovered by fractional crystallization of the residue extracted with ethyl acetate.

It will be apparent that esters of other optically active hydroxy compounds can be prepared by making substitution of such compounds in the process above described and also it will be evident that the mixture of halides of the racemic isomers can be prepared by substituting equivalent reagents such as a phosphorus halide or a sulfuryl halide for the thionyl chloride above mentioned.

Modifications may be made in carrying out the present invention without departing from the spirit and scope thereof and the invention is to be limited only by the appended claims.

What is claimed is:

1. The process for resolving a mixture of the stereoisomers of cis-2-(4'-carboxy-butyl)-3:4-ureido-tetrahydrothiophene (M.P. about 232° C.), that comprises forming a mixture of the esters of said stereoisomers with l-mandelic acid, separating the ester of said l-mandelic acid with one of said stereoisomers by fractionally crystallizing said mixture of esters from methanol solution, and treating said ester with aqueous alkali followed by acidification to produce the corresponding stereoisomer of cis-2-(4'-carboxy-butyl)-3:4-ureido-tetrahydrothiophene.

2. The process for recovering the dextrorotatory stereoisomer of cis-2-(4'-carboxy-butyl)-3:4-ureido-tetrahydrothiophene from a mixture containing said dextrorotatory stereoisomer admixed with the corresponding laevorotatory stereoisomer, that comprises forming a mixture of esters of said stereoisomers with l-mandelic acid, separating the l-mandelic acid ester of the dextrorotatory stereoisomer in substantially pure form by extracting said mixture with ethyl acetate and fractionally crystallizing the extract from methanol solution, and treating said ester with aqueous alkali followed by acidification to produce d-cis - 2 - (4' - carboxy-butyl) - 3:4 - ureido-tetrahydrothiophene.

3. The process for resolving a mixture of the stereoisomers of cis-2-(4'-carboxy-butyl)-3:4-ureido-tetrahydrothiophene (M. P. about 232° C.) that comprises reacting said mixture of stereoisomers with a substance selected from the class consisting of phosphorus halides, sulfuryl halides and thionyl halides, to convert the 4'-carboxy-radical of each of said stereoisomers to the corresponding acid halide group, reacting said mixture of stereoisomeric acid halides with l-mandelic acid to produce a mixture of mandelic acid esters of said stereoisomers, separating an ester of said l-mandelic acid with one of said stereoisomers by fractionally crystallizing said mixture of esters from methanol solution, and treating said ester with aqueous alkali followed by acidification to produce the corresponding stereoisomer of cis-2-(4'-carboxy-butyl)-3:4-ureido-tetrahydrothiophene.

4. The process for recovering the dextrorotatory stereoisomer of cis-2-(4'-carboxy-butyl)-3:4-ureido-tetrahydrothiophene from a mixture containing said dextrorotatory stereoisomer admixed with the corresponding laevorotatory stereoisomer, that comprises reacting said mixture of stereoisomers with a substance selected from the class consisting of phosphorus halides, sulfuryl halides, and thionyl halides, to convert the 4'-carboxy radical of each of said stereoisomers to the corresponding acid halide group, reacting said mixture of stereoisomeric acid halides with l-mandelic acid to produce a mixture of esters of said stereoisomers with l-mandelic acid, separating the l-mandelic acid ester of the dextrorotatory stereoisomer in substantially pure form by extracting said mixture with ethyl acetate and fractionally crystallizing the extract from methanol solution, and treating said ester with aqueous alkali followed by acidification to produce d-cis-2-(4'-carboxy-butyl)-3:4-ureido tetrahydrothiophene.

5. The process of recovering the l-mandelic acid ester of d-cis-2-(4'-carboxy-butyl)-3:4-ureido-tetrahydrothiophene from a mixture containing that ester admixed with the corresponding ester of l-cis-2-(4'-carboxy-butyl)-3:4-ureido-tetrahydrothiophene, which comprises dissolving said mixture in methanol solution and fractionally crystallizing the sparingly soluble l-mandelic acid ester of d-cis-2-(4'-carboxy-butyl)-3:4-ureido-tetrahydrothiophene from said solution.

6. The process that comprises reacting dl-cis-2 - (4' - carboxy-butyl) - 3:4 - ureido-tetrahydrothiophene with a substance selected from the class consisting of phosphorous halides, sulfuryl halides and thionyl halides to convert the 4'-carboxy to an acid halide group.

7. The process that comprises reacting dl-cis-2 - (4' - carboxy-butyl) - 3:4 - ureido-tetrahydrothiophene with thionyl chloride to convert the 4'-carboxy to an acid chloride group.

8. The acid halide of dl-cis-2-(4'-carboxy-butyl)-3:4-ureido-tetrahydrothiophene.

9. The acid chloride of dl-cis-2-(4'-carboxy-butyl)-3:4-ureido-tetrahydrothiophene.

10. An ester of l-mandelic acid with a stereoisomer of cis-2-(4'-carboxy-butyl)-3:4-ureido-tetrahydrothiophene.

11. The l-mandelic acid ester of dextrorotatory cis-2-(4'-carboxy-butyl)-3:4-ureido-tetrahydrothiophene having the melting point of about 188–9° C.

KARL FOLKERS.
RALPH MOZINGO.
DONALD E. WOLF.

REFERENCES CITED

The following references are of record in the file of this patent:

UNITED STATES PATENTS

| Number | Name | Date |
|---|---|---|
| 2,374,212 | Karabinos et al. | Apr. 24, 1945 |

OTHER REFERENCES

Science, vol. 94 (Sept. 26, 1941), pages 308–309.

Rosenberg, "Chemistry and Physiology of the Vitamins," Interscience Publ., New York (1942), pages 471–472.

Science, vol. 97, (May 14, 1943), pages 447–448.

Jour. Amer. Chem. Soc., vol. 66 (Jan. 1944), page 157.